United States Patent [19]

Chan

[11] Patent Number: 5,688,452
[45] Date of Patent: Nov. 18, 1997

[54] MANUFACTURING PROCESS OF CONSTRUCTIVE MATERIAL

[76] Inventor: Tin Wing Chan, Suite 401, 8 Queen's Road Central, Central, Hong Kong

[21] Appl. No.: 688,691

[22] Filed: Jul. 29, 1996

[51] Int. Cl.$^6$ .................................................. B29C 70/28
[52] U.S. Cl. ................... 264/115; 264/109; 264/DIG. 69
[58] Field of Search ................................ 264/109, 115, 264/118, DIG. 69

[56] References Cited

U.S. PATENT DOCUMENTS

| | | | |
|---|---|---|---|
| 5,169,588 | 12/1992 | Estepp | 264/331.17 |
| 5,244,608 | 9/1993 | Andersen | 264/26 |
| 5,302,331 | 4/1994 | Jenkins | 264/115 |
| 5,439,735 | 8/1995 | Jamison | 428/255 |
| 5,556,457 | 9/1996 | Terza et al. | 106/697 |
| 5,569,424 | 10/1996 | Amour | 264/115 |

*Primary Examiner*—Mary Lynn Theisen
*Attorney, Agent, or Firm*—David & Raymond; Raymond Y. Chan

[57] ABSTRACT

A manufacturing process of a constructive material has a main purpose of recycling an industrial waste material such as coal ash, incense ash, timber dust, argil mud, and clay compound as a manufacturing foundation. An adequate amount mixture of the foundation is processed through a state of heating and pressuring to form a body of constructive material with outstanding characteristics of natural timber, stone, ivory, and etc., which would prudentially be the future replacement of the natural constructive elements. The constructive material not only meets the characteristics and qualification of natural constructive material, but also can virtually reduce the percentage rate of environmental mutilation and nature intrusion. Moreover, it can beneficially help to provide a better environment and a higher living standard.

19 Claims, 2 Drawing Sheets

| Performance | Natural timber | Constructive material of the present invention |
|---|---|---|
| Temperature fluctuation | Shape changing due to the fluctuation of temperaturewill | Shape not change while the fluctuation of temperature |
| Humidity fluctuation | Rotten due to the humidity fluctuationwazzu | Humidity and moisture proof |
| Regeneration ability | Uneasy to grow again | Recyclable |
| Weight and Density | Set by nature | Adjustable weight and density control |
| Combustibility | Flammable | Flammable proof |
| Rigidity | Set by nature | Can be adjust and control |
| Supply availability | Limited resource, tight | Unlimited |

Fig. 2

| Performance | Natural stone | Constructive material of the present invention |
|---|---|---|
| Moulding | Limitation | Can mold to desire form |
| Rigidity | Limitation | Can adjust to desire rigidity |
| Weight and density | Set by nature | Can adjust to light weight |
| Color | Set by nature | Can adjust to different color |
| Size | Set by nature | Can be infinitely large |

Fig. 3

MANUFACTURING PROCESS OF CONSTRUCTIVE MATERIAL

BACKGROUND OF PRESENT INVENTION

The present invention relates to a manufacturing process of a constructive material, which comprises a recycle process of environmental industrial waste as a manufacturing foundation by special manufacturing procedure to produce high quality artificial constructive dement for eventually become the replacing the natural building and construction elements such as timber, stone, ivory, and etc.

It is well known that timber is considered as one of the most important constructive element needed in today's industrial society. Timber source is massively utilized in the paper production and building construction industries. Especially in the modern world today, natural wood is well recognized as a valuable and beautiful building material for interior design. In addition, the wonderful characteristic of timber had brought major conveniences to our society for centuries. Recently, the environmental awareness group proceed against major conflict regarding the natural environmental protection, which in order to have a more sincere living environment, to extend human life span and to increase living standard. Therefore, the overall percentage rate of natural timber cutting must decline. The importance of natural environmental protection has led to a major governmental topic of "saving the timberland" due to the existence of our future. Long term usage of timber in our society has created a dependency for the natural constructive building material. Unless we find a replacement for the constructive building material, the natural timber usage prohibition will build great pressure and inconvenience for our society today.

Moreover, recently the paper production industries have improved in timber source conservation by recycling waste paper. Unfortunately, the architectural industries do not have any major movement or improvement. Even though there are certain artificial wood building materials provided in the market today, all the existing artificial wood building materials cannot successfully meet the qualification of natural timber wood. Accordingly, the artificial designed wood is merely surfaced and coated with wood patterned rubber sheet, which is generated from polystyrene foaming. Besides the feeling and the wood pattern on the outer surface, the artificial building material is unable to perform those major important features of the natural timber, such as sawing, shaving, nailing, painting, and etc. Therefore, the said rubber coated artificial building material cannot be widely distributed or used.

Unfortunately, today our industries all around the world are expanding, booming and growing tremendously, which is good in a way, but through the viewpoint of our environmental awareness group, the main focus is on the environmental pollution caused by the industrial waste and generated by our industries. Even though through all the years of cleaning up, the progress isn't very satisfying due to the fast accumulation rate of the industrial waste. Moreover, disposal of the waste is one of the most complex conflict in this case. The technology in our society today can only solve the environmental pollution problem to a certain extent, so that, up to now, the pollution problem still appears before us.

After many years of research in the industrial waste program and by the environmental awareness group, looking at the growing rate of the industries, and the high percentage reduction rate of the natural timber, the present invention of a revolutionary manufacturing process of a constructive material of the present invention is a solution to our problems.

SUMMARY OF THE PRESENT INVENTION

The main object of the present invention is to provide a manufacturing process of a constructive material for recycling the existing industrial waste as a foundation thereof Another object of the present invention is to provide a manufacturing process of a constructive material, in which the constructive material manufactured by the process of the present invention not only meets all the characteristics and qualification of natural timber, but also has better standard and qualification.

Another object of the present invention is to provide a manufacturing process of a constructive material, wherein by substituting and replacing the natural constructive material with the constructive material manufactured by the present invention can effectively help to decrease the percentage rate of forest cutting and to decline the percentage rate of nature intrusion which would provide a better living environment and a higher living standard.

BRIEF DESCRIPTION OF THE DRAWINGS

FIG. 2 is a physical property comparison table of the present invention and the natural timber according to the above first preferred embodiment of the present invention.

FIG. 3 is a physical property comparison table of the present invention and the natural stone according to the above first preferred embodiment of the present invention.

DETAILED DESCRIPTION OF THE PREFERRED EMBODIMENT

Figure 1:
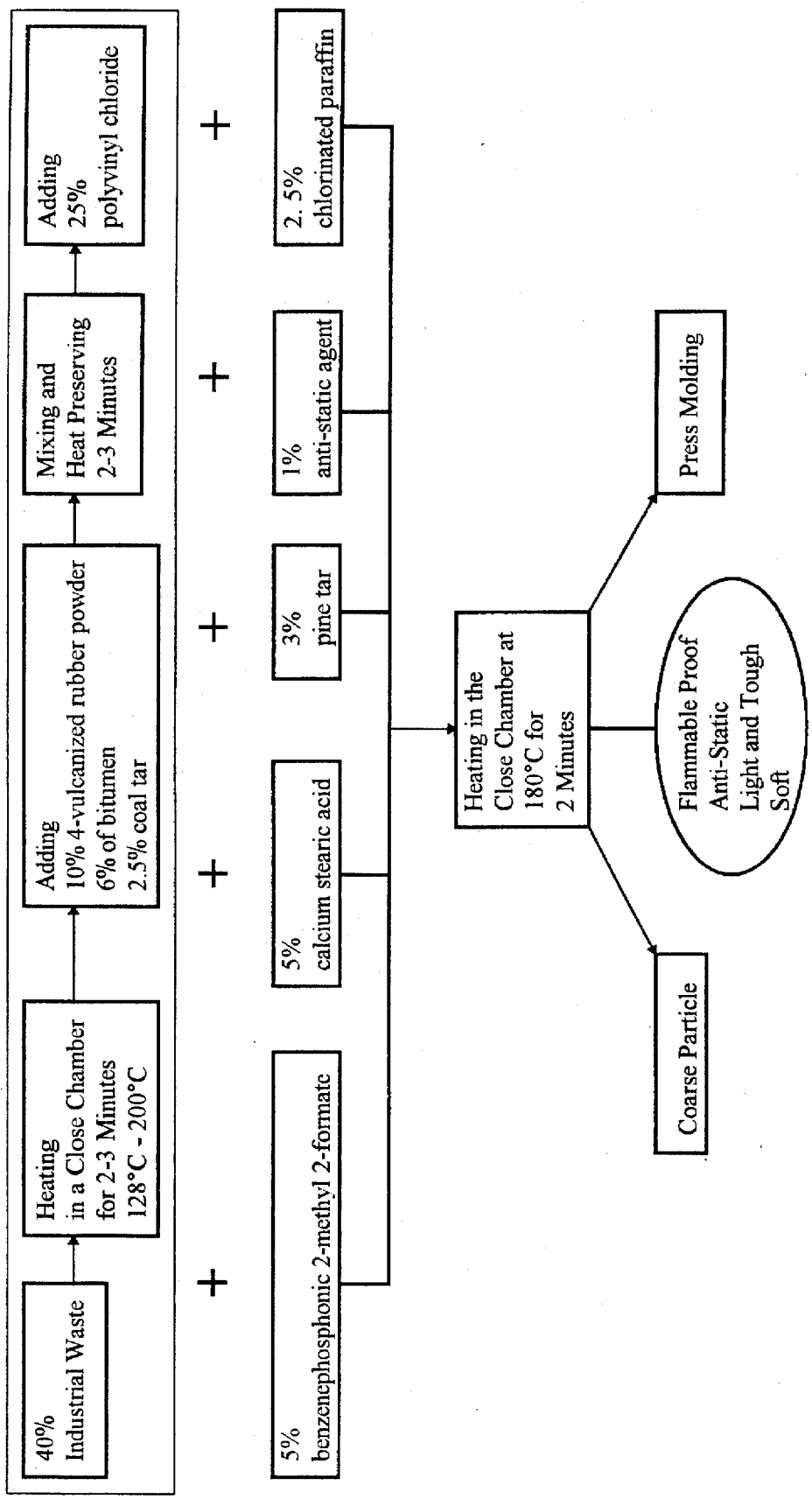
FIG. 1 is a block diagram of a first preferred embodiment according to the present invention.

Referring to FIG. 1 of the drawings, a block diagram illustrating a manufacturing process of a constructive material according to a preferred embodiment of the present invention is illustrated. The manufacturing process of the present invention comprises the following steps.

Firstly, purify by water washing and filtering, and fully mix a mixture of industrial waste, such as coal ash, incense ash, timber dust, argil mud, and/or natural clay compound, having a weight percentage of 35–40%, preferable 40%, of the finished constructive material.

Secondly, place the industrial waste in a closed chamber and heat to a temperature between 128 degree Celsius to 200 degree Celsius for 2 to 3 minutes.

Thirdly, add an adequate amount of synthetic material, which includes a weight percentage of 10% of 4-vulcanized rubber powder, a weight percentage of 6% of Bitumen, and a weight percentage of 2.5% of coal tar, into the closed chamber for fully blending and mixing with the heated industrial waste, and then heat preserve at least 90 degree Celsius for a time period of 2 to 3 minutes.

Fourthly, add and evenly mix a weight percentage of 25% of polyvinyl chloride with the above ingredients of the industrial waste and the synthetic material inside the close chamber.

Fifthly, add to the ingredients of the industrial waste and the synthetic material inside the closed chamber an adequate amount of modification material, which includes a weight percentage of 5% of ortho-benzene 2-methyl 2-formate, a weight percentage of 5% of calcium stearic acid, a weight percentage of 3% of pine tar, a weight percentage of 1% of anti-static agent, and a weight percentage of 2.5% of chlorinated paraffin, and then heat to a temperature at 180 degree Celsius for 2 minutes to form a raw constructive material compound with special characteristics of flammable proof, static proof and flexibility.

Finally, cut the raw constructive material compound into a plurality of coarse particles for easy transportation and/or press the building raw constructive material compound to a predetermined shape such as boards or strips by means of injection molding.

Accordingly, the constructive material products manufactured by the present invention not only have good properties of flexibility and anti-static, but also, similar to the natural constructive material such as the timber and wood, can be ground, shaved, punctured, saw, painted, molded, glued, compressed, and engraved.

Referring to FIG. 2, a comparison table illustrates the different characteristics between the natural timber and the constructive material products manufactured by the present invention under various conditions.

1. Under the condition of temperature change or fluctuation, unlike the natural timber, the constructive material products manufactured by the present invention will not expand when temperature raises or contract when temperature decreases, i.e. the constructive material products will maintain a constant form.

2. Under the condition of humidity change or fluctuation, unlike the natural timber, the constructive material products manufactured by the present invention is humidity proof that would prevent the material from rotting.

3. The natural timber has a disadvantage in the regrowth ability that, after harvest the regeneration of the natural timber takes a long period time. However, the constructive material products manufactured by the present invention can be easily recycled.

4. The weight density of the constructive material products manufactured by the present invention can be adjusted and controlled, however the weight density of the natural timber is set by nature.

5. The natural timber is highly flammable but the constructive material product manufactured by the present invention is flammable proof.

6. The rigidity of the natural timber is set by nature. The rigidity of the constructive material products manufactured by the present invention can be controlled and adequately adjusted.

The above table clearly shows that the constructive material products manufactured by the present invention has a better and higher physical features in comparison with the natural timber. Moreover, due to the crises of saving our planet and environmental protection, the supply of the nature timber is very limited. However, the supply of the constructive material products manufactured by the present invention is unlimited so that it is an incredible substitute for replacing the natural timber in our society today.

Referring to FIG. 3, it is a table of comparison between the constructive material products manufactured by the present invention and the natural stone, wherein 1. Under the condition of molding, the natural stones have limitation that are set by nature and the natural stones are difficult to have detail molding ability. The constructive material products manufactured by the present invention have a higher molding ability due to its unique characteristic.

2. The rigidity and hardness of the natural stones are set by nature, therefore all the natural stones have different quality and limitation. However, the rigidity and hardness of the constructive material products manufactured by the present invention can be controlled and adjusted to have extreme strength.

3. The weight density of the natural stone is already set by nature but the weight density of the constructive material products manufactured by the present invention can be controlled and adjusted to have extreme lightness.

4. The color of the natural stone is set by nature but the color of the constructive material products manufactured by the present invention can be controlled and adjusted.

5. The size of the natural stone is set by nature but the constructive material products manufactured by the present invention can be controlled and adjusted to any size.

According to the characteristic of the present invention, the constructive material products manufactured by the present invention is also a very good substitute for the natural stone.

In addition, the constructive material product manufactured by the present invention has the good features of molding, sculpture and engraving, so that it can replace the endangered ivory or the jade due to its unique and high standard characteristic.

It is worth to mention that predetermined additional gradients can be added to the constructive material compound before the final step of the manufacturing process of the present invention, in which specific features such as pesticide proof, flammable proof, earthquake proof and humidity proof can thus be achieved.

The present invention can help our society to take a great leap of improving and protecting our environment by replacing the usage of natural constructive resources with the constructive material products manufactured by the present invention. The constructive material products manufactured by the present invention can not only meet the requirement but also have better physical features than the natural constructive material. The present invention provides a very economical way to support the existing inconvenience of our industrial society today.

I claim:

1. A manufacturing process of a constructive material, comprising a plurality of steps of:

(a) purifying and fully mixing an industrial waste mixture consisting essentially of coal ash, incense ash, timber dust, argil mud, and natural clay compound, in which said industrial waste mixture has a weight percentage of 35–40% of said constructive material;

(b) placing said industrial waste mixture in a closed chamber for heating to a temperature between 128 degree Celsius to 200 degree Celsius for 2 to 3 minutes;

(c) adding a predetermined amount of synthetic material into said closed chamber for fully blending and mixing with said heated industrial waste mixture and heat preserving for a time period of 2 to 3 mutes, in which said synthetic material includes a 4-vulcanized robber powder having a weight percentage of 10% of said constructive material, a bitumen having a weight percentage of 6% of said constructive material, a coal tar having a weight percentage of 2.5% of said constructive material;

(d) adding a predetermined amount of polyvinyl chloride into said closed chamber and evenly mixing said polyvinyl chloride with said industrial waste mixture, said 4-vulcanized robber powder, said bitumen, and said coal tar inside said closed chamber, wherein said polyvinyl chloride has a weight percentage of at least 25% of said constructive material; and (e) further adding a predetermined amount of modification material into said closed chamber and heating to a temperature at 180 degree Celsius for 2 minutes to form a raw constructive material compound, in which said modification material includes an ortho-benzene 2-methyl 2-formate having a weight percentage of 5% of said constructive material, a calcium stearic acid having a weight percentage of 5% of said constructive material, a pine tar having a weight percentage of 3% of said constructive material, an anti-static agent having a weight percentage of 1% of said constructive material, and a chlorinated paraffin having a weight percentage of 2.5% of said constructive material.

2. A manufacturing process of a constructive material, as recited in claim 1, after step (e), further comprising a step of cutting said raw constructive material compound into a plurality of coarse particles.

3. A manufacturing process of a constructive material, as recited in claim 1, after step (e), further comprising a step of pressing said raw constructive material to a predetermined shape by means of molding.

4. A manufacturing process of a constructive material, as recited in claim 1, wherein, in said step (a), said industrial waste mixture is purified by water washing and filtering.

5. A manufacturing process of a constructive material, as recited in claim 2, wherein, in said step (a), said industrial waste mixture is purified by water washing and filtering.

6. A manufacturing process of a constructive material, as recited in claim 3, wherein, in said step (a), said industrial waste mixture is purified by water washing and filtering.

7. A manufacturing process of a constructive material, as recited in claim 1, wherein, in said step (a), said weight percentage of said industrial waste mixture is 40% of said constructive material.

8. A manufacturing process of a constructive material, as recited in claim 2, wherein, in said step (a), said weight percentage of said industrial waste mixture is 40% of said constructive material.

9. A manufacturing process of a constructive material, as recited in claim 3, wherein, in said step (a), said weight percentage of said industrial waste mixture is 40% of said constructive material.

10. A manufacturing process of a constructive material, as recited in claim 1, wherein, in step (c), said heat preserving is processed at least 90 degree Celsius.

11. A manufacturing process of a constructive material, as recited in claim 2, wherein, in step (c), said heat preserving is processed at least 90 degree Celsius.

12. A manufacturing process of a constructive material, as recited in claim 3, wherein, in step (c), said heat preserving is processed at least 90 degree Celsius.

13. A manufacturing process of a constructive material, as recited in claim 8, wherein, in step (c), said heat preserving a processed at least 90 degree Celsius.

14. A manufacturing process of a constructive material, as recited in claim 9, wherein, in step (c), said heat preserving a processed at least 90 degree Celsius.

15. A manufacturing process of a constructive material, as recited in claim 1, wherein, in step (d), said weight percentage of said polyvinyl chloride is 25% of said constructive material.

16. A manufacturing process of a constructive material, as recited in claim 2, wherein, in step (d), said weight percentage of said polyvinyl chloride is 25% of said constructive material.

17. A manufacturing process of a constructive material, as recited in claim 3, wherein, in step (d), said weight percentage of said polyvinyl chloride is 25% of said constructive material.

18. A manufacturing process of a constructive material, as recited in claim 13, wherein, in step (d), said weight percentage of said polyvinyl chloride is 25% of said constructive material.

19. A manufacturing process of a constructive material, as recited in claim 14, wherein, in step (d), said weight percentage of said polyvinyl chloride is 25% of said constructive material.

\* \* \* \* \*